3,629,410
ALPHA ADRENERGIC BLOCKING AGENTS
Melvin H. Heiffer, Rockville, Md., and David P. Jacobus, Washington, D.C., assignors to the United States of America as represented by the Secretary of the Army
No Drawing. Filed May 23, 1969, Ser. No. 827,162
Int. Cl. A61k 27/00
U.S. Cl. 424—211                      4 Claims

ABSTRACT OF THE DISCLOSURE

The disclosure relates to compounds having the following formula:

$$H_2N(CH_2)_mNH(CH_2)_nSY$$

wherein $m$ may be the integers 4 through 10 and $n$, 2 through 10, and SY is a sulfur containing function which may be metabolically converted to an —SH group, such as salts of thiols, phosphorothioic acid, thiosulfuric acid, alkyl thioethers, aryl thioethers, aralkyl thioethers and heteryl thioethers. The compounds of this invention are useful agents in blocking alpha-adrenergic mediated responses in animals; and in management of conditions such as hemorrhagic hypotensions, pheochromocytoma, and Raynaud's disease.

---

The invention described herein may be manufactured and used by or for the Government for governmental purposes without the payment to us of any royalty thereon.

BACKGROUND OF THE INVENTION

(1) Field of the invention

This invention includes sulfur substituted aminoalkyl-amino alkyl salts in metabolically acceptable form for use in the blockade of alpha-adrenergic receptors.

(2) Description of the prior art

As disclosed in Windsor Cutting's Handbook of Pharmacology, pages 423–429 (2d edition Meredith Publishing Co., New York 1964) previous compounds having alpha-adrenergic blocking effects included ring systems as for example phenoxybenzamine. The compounds of this invention, however, achieve outstanding blocking effects and are aliphatic in nature.

The compounds of this invention are known antiradiation drugs. Their use in antiradiation medicine is the subject of a copending patent application Ser. No. 784,231, filed Dec. 16, 1968, and their preparation is described by Piper et al., J. Med. Chem. 12, 236 (March 1969).

SUMMARY

This invention includes the use as agents in alpha-adrenergic response of compounds having the formula:

$$H_2N(CH_2)_mNH(CH_2)_nSY$$

wherein $m$ may be the integers 4 through 10 and $n$, 2 through 10, and SY is a sulfur containing function which may be metabolically converted to an —SH group.

Accordingly, it is an object of this invention to provide an aliphatic sulfur containing, metabolically acceptable salt useful in converting the pressor response of epinephrine to a depressor response and in reducing the pressor response to norepinephrine in animals.

It is another object to provide aliphatic sulfur substituted compounds of the aminoalkylamino alkyl configuration useful metabolically as aliphatic thiols which may be administered in aqueous solution or with solid excipients either orally or the solution injected intravenously.

DESCRIPTION OF THE PREFERRED EMBODIMENTS

The compounds of this invention may be prepared by methods known in the art. See Cortese, Organic Synthesis, pages 91–93; Coll. vol. II, A. H. Blatt Ed., John Wiley and Sons, Inc., New York, 1943; S. Akerfeldt, Acta Chem. Scand., 14, 1980 (1960); J. R. Piper et al., Chem. Ind. (London), 2010 (1966).

The best modes of preparation are also illustrated in the previously cited patent application Ser. No. 784,231, filed Dec. 16, 1968, and in the previously cited publication by Piper et al., J. Med. Chem., 12, 236 (March 1969) wherein also are collected toxicity and dosage data. The aforesaid application stemmed from evaluation of the compounds used in this invention at the Walter Reed Army Institute of Research as antiradiation agents. Following that evaluation, further research developed the novel and unexpected use herein disclosed and claimed.

The evidence of pharmacologic effectiveness of the drugs of this invention has been established through detailed animal experiments using several species of laboratory creatures, including rats, mice, guinea pigs, rabbits, cats, dogs, and monkeys. The drugs were administered intravenously and caused the pressor response produced by norepinephrine to be reduced by 50% or more, and to convert the pressor response to epinephrine to a depressor response even in therapeutically safe dosages. Representative compounds had no measurable effects upon blood pressure response to isoproterenol, acetylcholine, histamine, and angiotensin.

For ease of administration, stability, and convenience in pharmaceutical formulation, the requisite agents may be converted into the appropriate salts or used in the form of free bases. Representative acids which may be selected for preparation of salts according to well known methods of formulation are hydrochloric, sulfuric, sulfamic, nitric, malic, maleic, fumeric, citric, meconic, toluenesulfonic, lactic, tartaric, methanesulfonic, 2-hydroxyethane sulfonic, acetic, and methane-1,1'-(2-hydroxy-3-naphthoic) acid. In formulations said drugs may be administered intravenously in aqueous solutions, or orally in compositions with solid excipients. In preparation of oral dosage forms the neat compounds (or salts) may be admixed with a variety of convenient excipients such as talc, lactose, microcrystalline cellulose, starch, magnesium stearate, and dextrose.

Example I.—Rapid intravenous injections of norepinephrine and epinephrine in doses of 1 to 3 micrograms per kilogram of body weight in dogs produced a typical rise in blood pressure. Fifteen minutes after, an intravenous injection of 50 mg. per kg. body weight over 1 to 3 minutes of S-2-(5-aminopentylamino)ethyl phosphorothioic acid monohydrate the pressor response to norepinephrine and epinephrine was augmented. Thirty minutes after the injection the pressor responses were less than those during a control period. Forty-five minutes later the pressor responses of norepinephrine were reduced further and the blood pressure response to epinephrine was diphasic; sixty minutes after the injection the pressor response to norepinephrine was reduced by approximately 50% and the blood pressure response to epinephrine was converted to a classical depressor response. A much larger dose of epinephrine (10–20 micrograms per kilogram of body weight) caused a pressor response, but the rise in pressure was equal to or smaller than the rise in blood pressure caused by 1 microgram per kilogram of body weight of epinephrine in the control period. The blockade to test doses of norepinephrine and epinephrine was still present for 24 hours even after the demonstration of reversible blockage by administering greater doses of the catecholamines.

Example II.—In another series of experiments S-2-(5-aminopentylamino)ethyl phosphorothioic acid monohydrate antagonized the epinephrine, norepinephrine, and phenylephrine induced contraction of an isolated rabbit aorta after 60 minutes exposure to a $10^{-4}$ molar concentration, but did not antagonize the contraction induced by 5-hydroxy tryptamine.

The aorta was isolated in a water bath and subjected to from $10^{-10}$ to $10^{-8}$ molar solution of epinephrine followed by a $10^{-4}$ molar solution of the S-2-(5-aminopentylamino)ethyl phosphorothioic acid monohydrate. Additional tests were run with from $10^{-9}$ to $10^{-7}$ molar solutions of phenylephrine, and similar blocking resulted on introduction of the above phosphorothioic acid monohydrate. 5-hydroxy tryptamine was introduced into the bath at concentrations of $10^{-9}$ to $10^{-7}$ molar and was not antagonized by the same phosphorothioic acid monohydrate.

Example III.—In another series of experiments, S-2-(5-aminopentylamino)ethyl phosphorothioic acid monohydrate, when given in doses of 50 to 100 mg./kg. intravenously to dogs, cats, rabbits, and guinea pigs, caused alpha-andrenergic blockade on the cardiovascular system as determined by the response to injected epinephrine. In these same animals, the test chemical did not antagonize phenylephrine, epinephrine, or norepinephrine-induced inhibition of the contractions of the isolated ilium of these species. This was true even in the presence of propanolol. S-2 - (5 - aminopentylamino)ethyl phosphorothioc acid monohydrate added to the suspending medium for periods up to two hours in concentrations of from $10^{-6}$ to $10^{-4}$ molar could not elicit antoganism of the adrenergic mediated relaxation of the small intestine of these species. These results indicate that the subject agent selectively antagonized the action of catecholamines on the vasculature but not on intestinal smooth muscle.

Example IV.—In another experiment, S-2-(5-aminopentylamino)ethane thiol blocked epinephrine and phenylephrine-induced contractions of the isolated spiral strips of rabbit aorta but did not antagonize the phenylephrine-induced relaxation of the rabbit ilium.

Example V.—In another similar experiment, S-2-(5-aminopentylamino)ethyl phosphorothioic acid monohydrate at concentrations of $10^{-4}$ to $10^{-3}$ molar antagonized the contractions of the isolated mouse spleen induced by norepinephrine when added to the bathing medium. S-2-(5-aminopentylamino phosphorothioic acid monohydrate antagonized acetylcholine-induced contractions of the isolated mouse spleen but only at high doses of the antogonist and in a manner not paralled to the antogonism of the norepinephrine-induced contractions. These observations further support the contention that the subject agent possesses anti-adrenergic properties.

Example VI.—The following example was initiated to evaluate compounds of this invention in the post-treatment of acute hypovolemic (hemorrhagic) shock. Twenty-two adult mongrel dogs and fourteen adult Rhesus monkeys were anesthetized with pentobarbital sodium (30 mg./kg., I. V.). Changes in arterial and venous blood pressures, EKG, heart rate, and respiratory rate were continuously recorded on a Sanborn polygraph. In addition, hourly samples of arterial and venous blood were drawn for determination of pH, $O_2$ and $CO_2$ content. Samples were analyzed on a Beckman Physiological Gas Analyzer. All animals were bled to a mean arterial pressure of 50 mm. Hg and maintained at that level for eight hours. Three hours after initial hemorrhage, paired animals were divided at random into either a control or a treatment group. Control animals received no therapy while the treated group received 50 mg./kg. of S-2-(5-aminopentylamino)ethyl phosphorothioic acid intravenously. All animals showed a progressive decrease in arterial pH from a control of 7.42 to 7.30 during the first three hours after hemorrhage. Oxygen content in the venous blood fell from 15.6 vol. percent to 8.7 vol. percent while arterial carbon dioxide decreased from 42.0 vol. percent to 25.3 vol. percent. Average heart rate increased from 140/min. to 204/min. at three hours post-hemorrhage. Control animals continued to deteriorate during the entire observation period. At eight hours venous $O_2$ had decreased to 6.0 vol. percent, arterial $CO_2$ to 18 vol. percent, pH to 7.24. Heart rate increased to 240/min. Treated animals, after three hours, showed slow but progressive recovery of pH; venous $O_2$ and arteriol $CO_2$ towards pre-hemorrhage values. At eight hours arterial pH stabilized at 7.45, venous $O_2$ at 15.5 vol. percent and arterial $CO_2$ at 44.8 vol. percent. Heart rate decreased from 204 beats/min. to 120/min. during the same period of time. Seven of the eleven treated dogs permanently survived the hemorrhagic shock syndrome. Seven of seven monkeys treated in the same manner likewise survived. None of the control dogs or monkeys were alive at 24 hours. Results of this study indicate that the compound effectively prevents "irreversible" hemorrhagic hypotension in both dogs and monkeys. The mechanism by which this drug produces this beneficial effect may be related to its known alpha-adrenergic blocking properties and/or to its direct vasodilating action on the peripheral vasculature. The decrease in heart rate consistently noted after administration of this compound, coupled with the vasodilation, may serve to increase both stroke volume and cardiac output and in this way re-establish blood flow to hypoxic tissues.

Example VII.—A hemorrhagic shock model in the anesthetized dog was used to evaluate the cardiovascular effects of S-2-(5-aminopentylamino)ethyl phosphorothioic acid when given during shock; three treated and two control animals were studied. The model differed slightly from standard shock models. Dogs were bled to a mean arterial pressure of 50 mm. Hg. Three hours after the beginning of the hemorrhage, both the treated and control animals were transfused over thirty minutes with the entire volume of shed blood remaining in the reservoir. Animals to be treated were selected at random and given 50 mg./kg. of the above compound intravenously fifteen minutes after the start of the transfusion. The drug was infused over one minutes. The animals were then followed for three additional hours before being transferred to cages.

Arterial pressure, right atrial pressure, and heart rate were monitored continuously. Cardiac output was measured by the dye dilution method. Total peripheral resistance, stroke volume, and central blood volume were calculated by standard formulae. These variables are expressed as percent of baseline values with the exception of arterial pressure which is in mm. Hg.

Results.—All three treated animals survived the 72 hour observation period whereas both control animals died. The cardiovascular results are presented in Table I. The changes during the first three hours of hemorrhagic hypotension are comparable in both groups with a fall in cardiac output to less than 20% of baseline, a rise in total peripheral resistance to greater than 150% of baseline, a fall in central blood volume to 50% of baseline and a fall in stroke volume to approximately 15% of baseline values. Blood transfusion in the control group led to a temporary improvement in all measured variables. However, over the next three hours, deterioration was evident in falling cardiac output, and stroke volume, and a rising total peripheral resistance even though mean arterial pressure was maintained at 110 mm. Hg. The group treated with transfusion and the above compound stabilized at a lower mean arterial pressure than controls (85 mm. Hg vs. 110 mm. Hg) but maintained a higher cardiac output (65% vs. 31%) and stroke volume (57% vs. 33%) and a lower total peripheral resistance (89% vs. 42%) than controls. Central blood volume was comparable in both groups. Heart rate slowed in both groups during transfusion with or without the compound. However, in the control group the heart rate remained relatively slower than the treated group.

These results show that measured cardiovascular variables indicating blood flow (cardiac output and total peripheral resistance but not arterial pressure) are improved significantly by treatment with S-2-(5-aminopentylamino) ethyl phosphorothioic acid and this improvement is correlated with the prevention of irreversible shock in the dog.

TABLE I

| Variable | Group | Before treatment | | | | After treatment | | |
|---|---|---|---|---|---|---|---|---|
| | | Time | | | | | | |
| | | 0 min. | 60 min. | 120 min. | 180 min. | 210 min. | 300 min. | 366 min. |
| Arterial pressure (mm. Hg) | Control | 157 | 50 | 50 | 50 | 130 | 118 | 112 |
| | Treated | 143 | 50 | 50 | 50 | 95 | 85 | 80 |
| Percent baseline: | | | | | | | | |
| Heart rate | Control | 100 | 85 | 105 | 100 | 82 | 72 | 65 |
| | Treated | 100 | 129 | 121 | 124 | 81 | 112 | 112 |
| Cardiac output | Control | 100 | 13 | 21 | 18 | 71 | 37 | 31 |
| | Treated | 100 | 17 | 16 | 16 | 110 | 65 | 65 |
| Total peripheral resistance | Control | 100 | 244 | 151 | 186 | 117 | 205 | 242 |
| | Treated | 100 | 231 | 214 | 231 | 62 | 98 | 89 |
| Stroke volume | Control | 100 | 14 | 20 | 15 | 100 | 41 | 33 |
| | Treated | 100 | 13 | 13 | 13 | 131 | 58 | 59 |
| Central blood volume | Control | 100 | 52 | 54 | 56 | 100 | 82 | 86 |
| | Treated | 100 | 48 | 51 | 49 | 109 | 85 | 83 |

We claim:
1. The method of blocking alpha-adrenergic-mediated responses in mammals which comprises administering to mammals, intravenously or orally 50 mg./kg. to 100 mg./kg. of a compound having the formula.

$$H_2N(CH_2)_mNH(CH_2)_nSY$$

wherein $m$ has a value of from 4 to 10 and $n$ has a value of from 2 to 10, and SY is a sulfur containing function consisting of phosphorothioic acid.

2. The method of claim 1 wherein the compound is S-2-(4-aminobutylamino)ethyl phosphorothioic acid.

3. The method of claim 1 wherein the compound is S - 2 - (5 - aminopentylamino)ethyl phosphorothioic acid monohydrate.

4. The method of claim 1 wherein the compound is S - 2 - (6 - aminohexylamino)ethyl phosphorothioic acid dihydrate.

References Cited
UNITED STATES PATENTS

| | | | |
|---|---|---|---|
| 2,411,527 | 11/1946 | Dickey et al. | 260—945 |
| 2,924,615 | 2/1960 | Dornfeld | 260—999 |
| 3,124,508 | 3/1964 | Nordmann | 260—944 X |
| 3,240,802 | 3/1966 | Robertson | 424—211 |

ALBERT T. MEYERS, Primary Examiner

N. A. DREZIN, Assistant Examiner

U.S. Cl. X.R.

260—944